(12) United States Patent
Kuno et al.

(10) Patent No.: US 6,713,130 B1
(45) Date of Patent: Mar. 30, 2004

(54) METHOD TO PRODUCE A CERAMIC PRODUCT HAVING CONTROLLED MODULES OF ELASTICITY AND INTERNAL FRICTION CHARACTERISTICS

(75) Inventors: Hiroaki Kuno, Tokoname (JP); Keisuke Yamamoto, Tokoname (JP); Kenji Isogai, Tokoname (JP); Masashi Miura, Tokoname (JP); Toshiaki Shimadzu, Tokoname (JP); Masaaki Nagamatsu, Takasaki (JP)

(73) Assignee: Inax Corporation, Tokoname (JP)

( * ) Notice: Subject to any disclaimer, the term of this patent is extended or adjusted under 35 U.S.C. 154(b) by 13 days.

(21) Appl. No.: 10/048,170

(22) PCT Filed: Aug. 4, 2000

(86) PCT No.: PCT/JP00/05282
§ 371 (c)(1),
(2), (4) Date: Apr. 26, 2002

(87) PCT Pub. No.: WO01/10794
PCT Pub. Date: Feb. 15, 2001

(30) Foreign Application Priority Data

Aug. 4, 1999 (JP) .............................................. 11-221134
Jul. 5, 2000 (JP) ........................................ 2000-204284

(51) Int. Cl.$^7$ ............................... B05D 3/02; B05D 5/00
(52) U.S. Cl. ............................... 427/385.5; 427/443.2; 84/330; 84/452 R; 84/452 P
(58) Field of Search ............................... 84/330, 380 R, 84/383 R, 452 R, 452 P; 427/385.5, 443.2

(56) References Cited

U.S. PATENT DOCUMENTS 4,860,629 A  8/1989  Del Giudice ................. 84/395
5,792,717 A  8/1998  Takayama ..................... 201/88

FOREIGN PATENT DOCUMENTS

EP          377980       7/1990
JP          63-252981    10/1988
JP          8-119771     5/1996

Primary Examiner—Katherine A. Bareford
(74) Attorney, Agent, or Firm—Oblon, Spivak, McClelland, Maier & Neustadt, P.C.

(57) ABSTRACT

A method to make a mouthpiece body having a predetermined set of desired characteristics for a given application comprises providing a porous ceramic material, infiltrating it with an acrylic resin, and curing the article, wherein the properties of the ceramic material, the acrylic resin, and the infiltration ratio are selected in order to control the modulus of elasticity and internal friction of the mouthpiece.

2 Claims, 5 Drawing Sheets

METHOD TO PRODUCE A CERAMIC PRODUCT HAVING CONTROLLED MODULES OF ELASTICITY AND INTERNAL FRICTION CHARACTERISTICS

This is a national stage application of PCT/JP00/05282, filed on Aug. 4, 2000, having a priority date of Aug. 4, 1999.

TECHNICAL FIELD

The present invention relates to a method for production of a ceramic product, and to a ceramic product. The invention is favorable to musical instruments, building materials, etc., and to a method for producing them.

BACKGROUND ART

Heretofore, for example, known is a method of applying a synthetic resin to a machinable ceramic material followed by finishing the resulting, resin-dipped ceramic material into musical instruments having a desired form (Japanese Patent Laid-Open No. 181787/1990).

Compared with other conventional instruments made of wood, the instruments produced according to the method have the advantage of good durability intrinsic to the ceramic material and the synthetic resin constituting them and have good sound characteristics necessary to musical instruments not absorbing water and impervious to air. In addition, not using natural wood, the method for production is favorable for the protection of the environment.

DISCLOSURE OF THE INVENTION

Naturally, however, the ceramic product to be produced must have various characteristics necessary for their applications. Nevertheless, in the conventional method for production of a ceramic product mentioned above, musical instruments are merely produced with no consideration given to the necessary characteristics except the durability, the absence of water absorption and the air imperviousness.

Specifically, in the conventional method for production, nothing is taken into consideration relating to the applications of the ceramic product to be produced as to what characteristics are needed by the ceramic product and how the ceramic product is to be constituted so as to have the necessary characteristics. Therefore, in the conventional method for production, the ceramic product produced could have the necessary appearance and function to some degree, but are as yet not clarified as to whether or not they have surely satisfactory characteristics for their applications.

The present invention has been made in consideration of the current situation in the art mentioned above, and its object is to ensure the production of a ceramic product having satisfactory characteristics for predetermined applications.

The method for production of a ceramic product of the invention is characterized in that the desired characteristics of the ceramic product to be produced therein are first grasped, a porous ceramic material having the first characteristic and a fluid having the second characteristic are then prepared, the fluid is at least infiltrated into the ceramic material, and at least one of the first characteristic, the second characteristic and the infiltration ratio are controlled to produce the ceramic product.

In the method for production of the invention, the desired characteristics of the ceramic product to be produced are first grasped in accordance with the use of the ceramic product.

For example, in case where the ceramic product to be produced is a sounding medium for percussion instruments such as xylophones, marimbas, clappers, castanets, percussion blocks (such as those in Buddhist temples), etc., its necessary characteristics will be high density, high hardness and small internal friction ($Q^{-1}$).

In case where the ceramic product to be produced is a sound plate for stringed instruments such as pianos, violins, guitars, biwas (four-stringed Japanese lutes), kotos (Japanese harps), etc., its density will have to be within a specific range, and, in addition, its specific elastic modulus will have to be high and its sound attenuation factor will have to be low.

In case where the ceramic product to be produced is a resonator pipe for woodwinds such as clarinets, recorders (English flutes), shakuhachies (five-holed vertical bamboo flutes), etc., its sound attenuation factor will have to be within a specific range, and its elastic modulus (Young's modulus) will have to be within a specific range and will have to be anisotropic.

In addition, the instruments mentioned above will have to be further discussed for their other characteristics including vibration characteristics, sound radiation characteristics, vibration transmission characteristics, etc. Moreover, in case where they require machining in producing them, they must have good machinability for their mechanical characteristics. Accordingly, the sound characteristics and the mechanical characteristics of the ceramic product for such instruments are first grasped.

Regarding the vibration characteristics of instruments for percussion sounds, the beaten surface of the instruments will be readily deformed. In case where the instruments are made of a material having a longer contact time with a beating medium applied thereto, they could hardly produce sound components up to the high-frequency level, and their sounds will be mild as consisting essentially of low-frequency components.

The sound radiation characteristics of instruments are definitely reflected by the sounds that are produced by a rod sample of the same material as that of the instruments forcedly vibrated to give a flat frequency vibration sound (white noise). The sounds produced under such forced vibration give a sound spectrum to reflect the sound radiation characteristics of the instruments. The level of the sound pressure from instruments made of a hard material greatly fluctuates at around the resonance point; but that from instruments made of a soft material fluctuates only a little. This is because the internal friction of instruments made of a hard material falls between $\frac{1}{10}$, and $\frac{1}{30}$ of that of instruments made of a soft material. In addition, instruments made of a hard material have a higher sound transmission efficiency (degree of sound transmission) to give vibration sounds up to a high-frequency level, with the increase in their resonance point peak. Accordingly, it is understood that instruments made of a soft material have a filter effect capable of relatively strengthening low-frequency components to thereby depress high-frequency components that are offensive to human ears. In case where a ceramic material of uniform crystal orientation is used in producing instruments and where the internal friction of the material to be caused by the strain deformation thereof in the crystal orientation direction in the instruments is enlarged for high-frequency components, the filter effect of the instruments will be remarkable under free sound attenuation condition, and will characterize the mildness of the sounds produced by the instruments. The difference between the internal friction to be caused by bending strain and that to be caused by shearing strain will also give a sound spectrum.

Vibration will be more readily transmitted from a material having a smaller intrinsic sound resistance (sound impedance) $(E\rho)^{1/2}$, and a material having a larger specific Young's modulus (elastic modulus/specific gravity) ensures higher sound transmission and higher vibration response. Instruments made of a soft material have a low density and a low elastic modulus, and their sound resistance is low. However, in case where the soft material for instruments is a ceramic material of uniform crystal orientation, the specific Young's modulus in the crystal orientation direction of the instruments will be on the same level as that of instruments made of a hard material. Accordingly, the instruments made of such a soft ceramic material will be readily vibrated and their response to vibration change is good. The internal friction of instruments made of a soft material is large relative to the specific Young's modulus thereof. Therefore, the frequency characteristics of instruments made of a soft material are flat, compared with those of instruments made of a hard material. Accordingly, instruments made of a soft material are characterized in that each sound produced by them is rapidly attenuated and does not overlap with any others, and they will be therefore suitable to sound plates.

More concretely, in case where the ceramic product to be produced is for a mouthpiece body of a clarinet integrated with a resonator plate for a reed made of reed (plant), it must have sound characteristics including elastic modulus, internal friction, etc., and must have mechanical characteristics including machinability, etc. Therefore, for such a mouthpiece body, the sound characteristics and mechanical characteristics of the ceramic product to be produced are first grasped.

In case where the ceramic product to be produced is for building materials or for constitutive members for machines, etc., such building materials and constitutive members must have mechanical characteristics including tensile strength, bending strength, elastic modulus, machinability, etc. Therefore, for such building materials and constitutive members, the mechanical characteristics of the ceramic product to be produced are first grasped.

With that, a ceramic material and a fluid are prepared. The ceramic material is porous, and its first characteristic must be grasped. For the ceramic material, for example, employable is a machinable, sintered ceramic substance described in Japanese Patent Publication No. 21632/1992. The first characteristic of the ceramic material includes, for example, the apparent porosity, the mean pore radius and the machinability thereof. On the other hand, liquid and gaseous materials can be used for the fluid. The liquid material includes resin and rubber. The resin may be any of thermosetting resins or thermoplastic resins. In case where the fluid is a thermosetting resin selected from acrylic resins, unsaturated polyesters, epoxy resins, ABS, etc., its second characteristic is, for example, the elastic modulus of the thermosetting resin.

Next, the fluid is at least infiltrated into the ceramic material, and at least one of the first characteristic, the second characteristic and the infiltration ratio is controlled to produce the intended ceramic product. In case where the infiltration ratio is controlled, pores filled with air can be left in the ceramic product produced. In that case, therefore, the ceramic product produced shall have a composite structure composed of the ceramic material, the liquid such as a thermosetting resin or the solid from it, and air, and can realize the desired characteristics in a more preferred manner. In case where a thermosetting resin is used, it is infiltrated into the ceramic material and then cured therein to give a ceramic product. For the infiltration method to be employed herein, the parameters including the degree of reduced pressure or increased pressure, the processing time and the processing temperature may be suitably determined.

The ceramic product thus obtained is composed of the porous ceramic material having the first characteristic and the fluid having the second characteristic and having been infiltrated into the ceramic material or the solid from the fluid, and has the desired third characteristic attained by controlling at least one of the first characteristic, the second characteristic and the infiltration ratio. After the process, the ceramic product may be optionally post-processed for surface treatment including painting and polishing for further improving or modifying its design, quality, safety and feel.

BEST MODES OF CARRYING OUT THE INVENTION

One embodiment of the invention is described hereinunder with reference to the drawings attached hereto.

In this embodiment, produced is a ceramic product for a mouthpiece body for a clarinet. The vibration characteristics of the mouthpiece body will have an influence on the free vibration of the reed fitted to the body. When the reed is vibrated, it is opened and closed while being supported by its support, and gives periodic vibration to the mouthpiece body. With that, the mouthpiece body thus being vibrated further vibrates the reed, whereby the free vibration of the reed is combined with the sub-vibration having a different phase, thereby having an influence on the pure vibration of the reed that serves as a sound source to produce a sound tone.

Accordingly, in case where the mouthpiece body is expected to produce a sound comparable to that to be produced by conventional ones made of a ebonite material or even a granadilla material, it is desired that the mouthpiece body has an elastic modulus (Young's modulus (E)) falling between 10 and 100 (GPa) and an internal friction (in terms of its natural logarithm, $\log Q^{-1}$) of at most $1\times 10^{-3}$ for its sound characteristics. This is because, in the mouthpiece body having a larger elastic modulus, the support to which the reed is fitted could be more tough, and such a tough support could be worked more accurately and is hardly deformed. In addition, the mouthpiece body having a larger degree of internal friction could attenuate its vibration more rapidly, and will therefore more hardly transmit its vibration to the reed.

From the results of the experiments made by the present inventors, it is believed that the mouthpiece body preferably has a specific Young's modulus (elastic modulus (E)/specific gravity (ρ)) of at least 10 (GPa) and a degree of internal friction (in terms of its natural logarithm) of at least $1\times 10^{-1}$. More preferably, the specific Young's modulus of the mouthpiece body will be at least 15 (GPa) and the internal friction thereof (in terms of its natural logarithm) will be at least $2\times 10^{-3}$.

Then, a ceramic material and a fluid are prepared. The ceramic material prepared herein is a machinable, sintered ceramic rod described in Japanese Patent Publication No. 21632/1992. For its first characteristic, the ceramic material has a degree of porosity of 36%, an elastic modulus of 27.9 (Gpa) and a degree of internal friction (in terms of its natural logarithm) of $4.60\times 10^{-4}$.

The details including the degree of porosity and other parameters of high-density and low-density ceramic materials of the same type are given in Table 1 below.

The details of the machinability of high-density and low-density ceramic materials of the same type are given in Table 2 below.

TABLE 2

| Working Condition | | High-Density Ceramic | Low-Density Ceramic |
|---|---|---|---|
| Lathing | feeding rate, mm/revolution | 0.05 to 0.10 | 0.05 to 0.20 |
| Tool (carbide tool K-10) | depth of cut, mm | 0.1 to 4.0 | 0.1 to 6.0 |
| | cutting rate, m/min | 30 to 40 | 30 to 55 |
| Milling | feeding rate, mm/blade | 0.03 to 0.09 | 0.03 to 0.10 |
| Tool (carbide tool K-10) | depth of cut, mm | 0.5 to 5.0 | 0.5 to 10.0 |
| | cutting rate, m/min | 5 to 40 | 5 to 80 |
| Drilling | drill diameter, mm | 2.0φ, 5.0φ | 2.0φ, 5.0φ |
| Tool (carbide drill) | revolution, rpm | 300 to 1500, 300 to 1000 | 300 to 2000, 300 to 1000 |
| | feeding rate, mm/revolution | 0.01 to 0.10 | 0.01 to 0.10 |

On the other hand, soft and hard acrylic resins are prepared for the fluid. For their second characteristic, the soft acrylic resin has an elastic modulus of 0.05 (GPa), and the hard acrylic resin has an elastic modulus of 3 (GPa).

Figure 1:
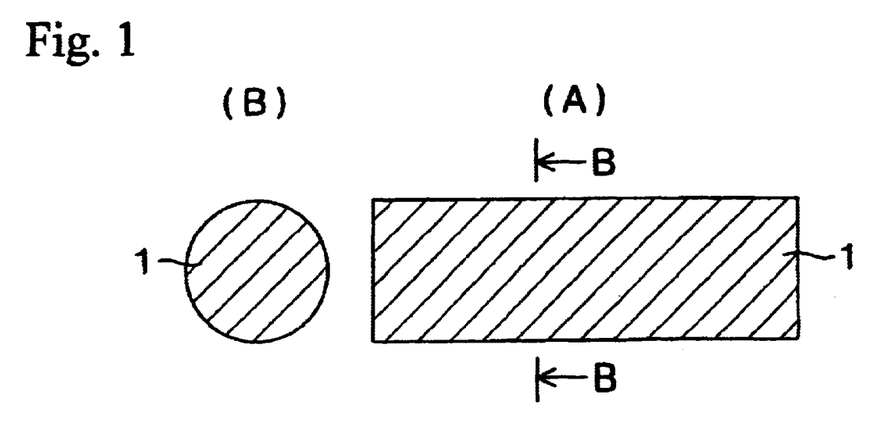
FIG. 1 relates to one embodiment of the invention, showing cross-sectional views of a ceramic material with an acrylic resin being infiltrated and solidified therein.

Next, the soft or hard acrylic resin is infiltrated into the ceramic material. In this step, the infiltration ratio of the resin is 100% to the pores of the ceramic material. The ceramic material infiltrated with the hard acrylic resin is Example 1; and that infiltrated with the soft acrylic resin is Example 2. Next, the acrylic resin in each ceramic material is cured. The ceramic material 1 with the cured resin therein is shown in FIG. 1, (A) and (B).

Figure 2:
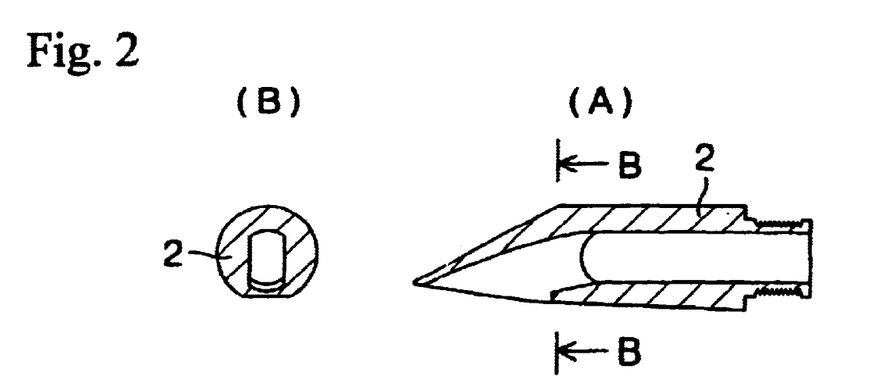
FIG. 2 relates to the embodiment of the invention, showing cross-sectional views of a mouthpiece body produced by machining the resin-infiltrated ceramic material.

The resin-infiltrated ceramic material 1 is then machined into a ceramic product, mouthpiece body 2 shown in FIG. 2, (A) and (B). The mouthpiece body 2 is composed of the porous ceramic material having the first characteristic and the acrylic resin having the second characteristic and having been infiltrated and cured in the ceramic material. Next, this is optionally post-processed for surface treatment including painting.

TABLE 1

| | Unit | High-Density Ceramic | Low-Density Ceramic | Remarks |
|---|---|---|---|---|
| Bulk Density | g/cm$^3$ | 2.1 | 1.9 | Archimedes' method |
| Apparent Porosity | % | 22 | 36 | Archimedes' method |
| Mean Pore Radius | μm | 1 | 0.7 | porosimetry by mercury penetration |
| Air Permeation | cm$^2$/sec | 0.6 | 1.1 | under permeation pressure of 1.0 kgf/cm$^2$ |
| Bending Strength | kgf/cm$^2$ | 800 | 650 | JIS R1601 |
| Compression Strength | kgf/cm$^2$ | 1200 | 750 | φ10 mm × 10 mm |
| Young's Modulus | kgf/cm$^2$ | $5.3 \times 10^5$ | $3.2 \times 10^5$ | sing-around method |
| Shore Hardness | Hs | 37 | 31 | |
| Volume Resistivity | Ω · cm | — | — | JIS C2141 |
| Dielectric Constant (1 MHz) | | — | — | JIS C2141 |
| Dielectric Loss Tangent (1 MHz) | | — | — | JIS C2141 |
| Breakdown Voltage | kV/mm | 5.6 | 16 | JIS C2141 (AC 60 Hz) |
| Highest Temperature for Use | ° C. | 900 | 1000 | temperature with no bending deformation |
| Thermal Impact Resistance (ΔT) | ° C. | 250 | 250 | temperature with no bending deformation |
| Thermal Expansion Coefficient | liter/° C. | $7 \times 10^{-6}$ | $7 \times 10^{-6}$ | room temperature to 400° C. |
| Thermal Conductivity | cal/cm · g · ° C. | 0.0032 | 0.0027 | hot-wire method (at 25° C.) |
| Specific Heat | cal/g · ° C. | 0.19 | 0.19 | adiabatic method |
| in 10% HCl at room temperature for 24 hrs | mg/cm$^2$ | 35 | its shape broken | weight loss measure method |
| in 10% NaOH at room temperature for 24 hrs | mg/cm$^2$ | 0.3 | 0.5 | weight loss measure method |

Figure 3:
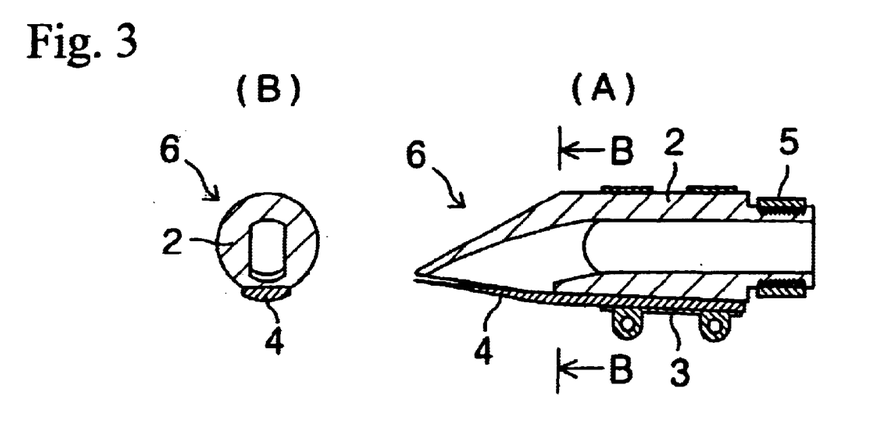
FIG. 3 relates to the embodiment of the invention, showing cross-sectional views of the mouthpiece produced by fitting a reed and other members to the mouthpiece body.
Figure 4:
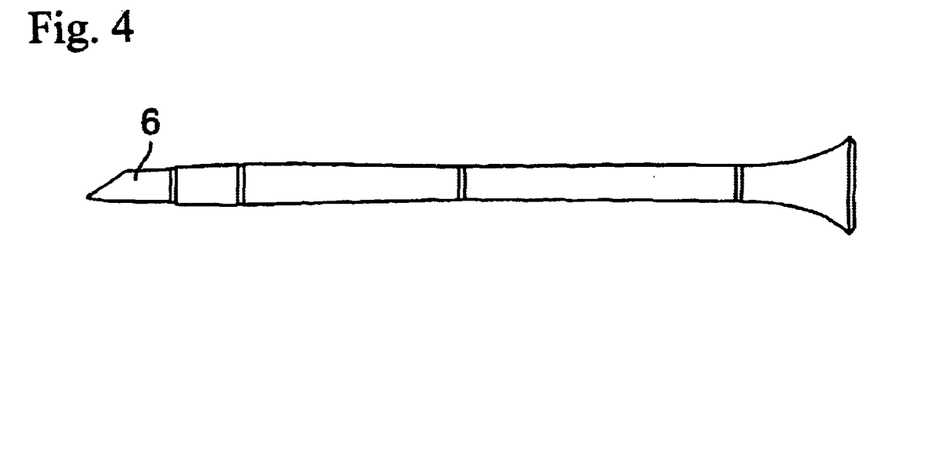
FIG. 4 relates to the embodiment of the invention, showing the front view of a clarinet.

The mouthpiece body 2 is fitted with a reed 4 made of reed (plant) by a fitting member 3, and with a cork 5 at its end, as in FIG. 3, (A) and (B). Thus is completed a mouthpiece 6. With that, the mouthpiece 6 is fitted into an ordinary ABS or wood member to complete a clarinet, as in FIG. 4.

(Evaluation 1)

A mouthpiece body is produced from a ceramic material alone for Comparative Example 1. The mouthpiece bodies of Examples 1 and 2 and Comparative Example 1 were compared with respect to their elastic modulus and internal friction. The results are shown in FIG. 5.

Figure 5:
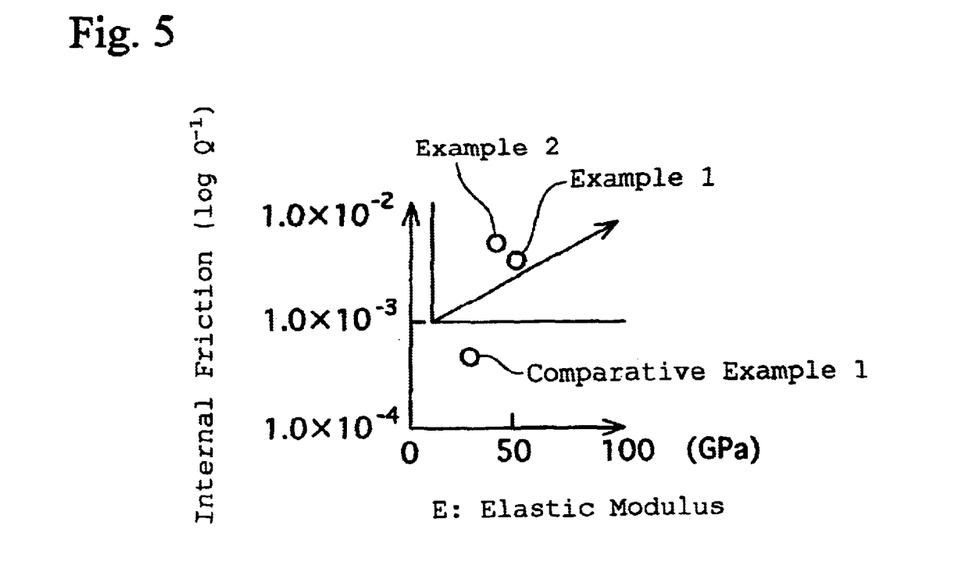
FIG. 5 relates to evaluation 1, showing a graph that indicates the elastic modulus and the internal friction of the mouthpiece bodies of Examples 1 and 2 and Comparative Example 1.

From FIG. 5, it is understood that the mouthpiece bodies of Examples 1 and 2 have the desired characteristics. Playing the clarinet having the mouthpiece body of these Examples, the players satisfied the sound tone from it.

(Evaluation 2)

Figure 6:
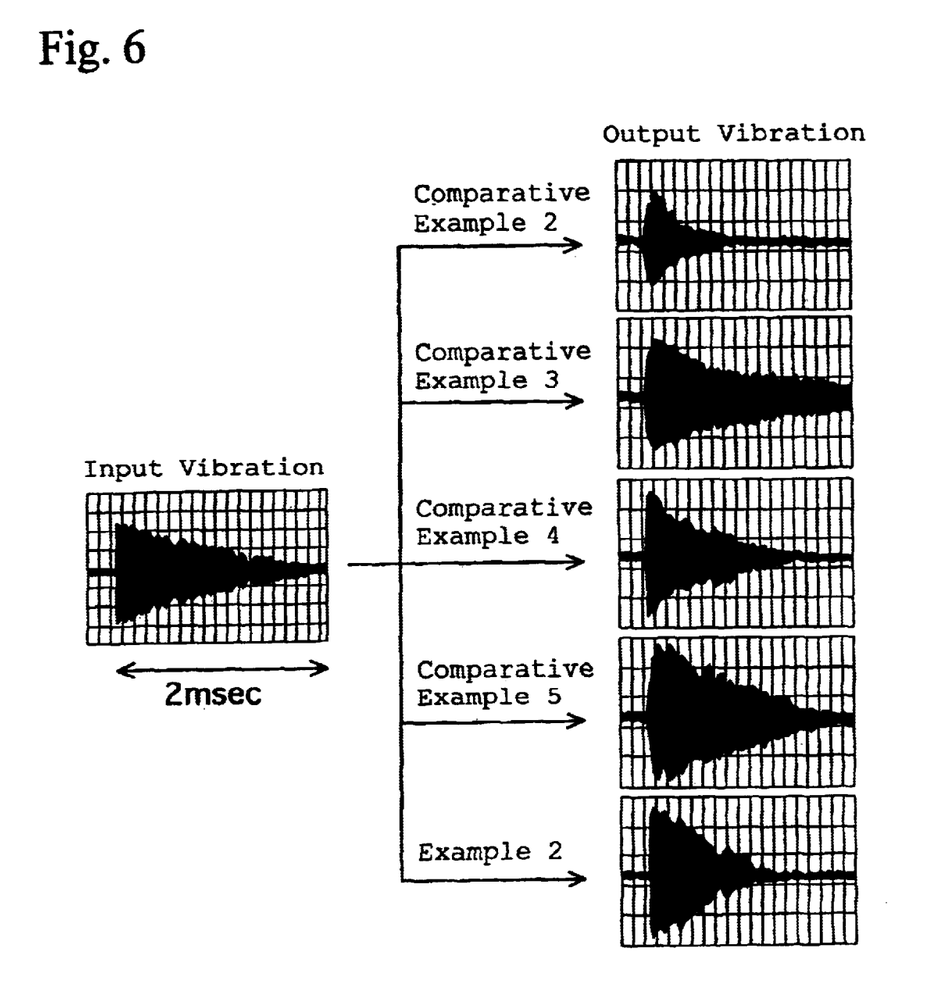
FIG. 6 relates to evaluation 2, showing correlation diagrams of the input vibration and the output vibration into and from the mouthpieces of Example 2 and Comparative Examples 2 to 5.

Mouthpieces were produced from ebonite (this is Comparative Example 2), brass (Comparative Example 3), ebony (Comparative Example4), and glass (Comparative Example 5). The mouthpieces of Example 2 and Comparative Examples 2 to 5 were evaluated for their vibration characteristics. To the reed of each mouthpiece, applied was an input vibration from an oscillator for 2 msec, as in FIG. 6, and the output vibration was detected by the receiver fitted to the end of each mouthpiece. The profile of the output vibration from each mouthpiece is shown in FIG. 6. The response to vibration and the vibration attenuation in each mouthpiece are given in Table 3.

TABLE 3

|  | Response to Vibration | Vibration Attenuation |
| --- | --- | --- |
| Comparative Example 2 | slow | high |
| Comparative Example 3 | relatively rapid | low |
| Comparative Example 4 | rapid | high (but fluctuated) |
| Comparative Example 5 | rapid | low |
| Example 2 | rapid | high |

From FIG. 6 and Table 3, it is understood that the mouthpieces of Comparative Examples 3 and 5, which are made of a rigid material, brass (a type of metal) or glass, rapidly respond to vibration as their rising vibration is large, but their vibration attenuation is low as the vibration therein continues for a long period of time.

On the other hand, it is understood therefrom that the mouthpiece of Comparative Example 2, which is made of a non-rigid material, ebonite, slowly responds to vibration as its rising vibration is small, and its vibration attenuation is high as the vibration therein does not continue for a long period of time.

As opposed to these, it is understood that the mouthpiece of Example 2 rapidly responds to vibration as its rising vibration is large, and its vibration attenuation is high as the vibration therein does not continue for a long period of time. In this respect, the mouthpiece of Example 2 is similar to that of comparative Example 4 made of ebony. However, it is to be noted that the mouthpiece of Example 2 differs from that of Comparative Example 4 in that the former gives a stable sound tone with no fluctuation of vibration attenuation therein.

(Evaluation 3)

The mouthpiece bodies of Example 2 and Comparative Example 1 were compared with respect to their water absorption (%), specific gravity, elastic modulus (GPa), thermal conductivity (W/mk) and linear thermal expansion coefficient (cm/° C.) from room temperature to 100° C. The results are given in Table 4.

TABLE 4

|  | Comparative Example 1 | Example 2 |
| --- | --- | --- |
| Water Absorption (%) | 15.3 | 0.37 |
| Specific Gravity | 1.92 | 2.09 |
| Elastic Modulus (GPa) | 31.6 | 41.2 |
| Thermal Conductivity (W/mk) | 1.05 | 1.26 |
| Linear Thermal Expansion Coefficient (cm/° C.) | $7.75 \times 10^{-6}$ | $13.7 \times 10^{-6}$ |

From Table 4, it is understood that the water absorption of the mouthpiece body of Example 2 is much lower than that of the mouthpiece body of Comparative Example 1. Accordingly, it is understood that the mouthpiece body of Example 2 is free from the problem with saliva that causes sound fluctuation.

(Evaluation 4)

The mouthpiece bodies of Example 2 and Comparative Examples 2 to 4 were compared with respect to their specific gravity, Young's modulus (GPa) and internal friction (in terms of its natural logarithm). The results are given in Table 5.

TABLE 5

|  | Specific Gravity | Young's Modulus | Internal Friction $\log Q^{-1}$ |
| --- | --- | --- | --- |
| Comparative Example 2 | 1.1 | 4.4 | $1 \times 10^{-2}$ |
| Comparative Example 3 | 8.5 | 98 | $1 \times 10^{-5}$ |
| Comparative Example 4 | 1.26 | 26.9 | $4.5 \times 10^{-3}$ |
| Example 2 | 2.09 | 41.2 | $2.7 \times 10^{-3}$ |

Materials of ABS resin, acrylic resin and aluminium were prepared. Mouthpiece bodies were produced from these, ABS resin, acrylic resin and aluminium for Comparative Examples 6 to 8. The mouthpiece bodies of Example 2, Comparative Examples 1 to 4 and 6 to 8 were compared with respect to their specific Young's modulus and internal friction. The results are given in Table 6 and FIG. 7.

TABLE 6

|  | Specific Young's Modulus $E/\rho$ | Internal Friction $\log Q^{-1}$ |
| --- | --- | --- |
| Comparative Example 1 | 16.5 | $7.0 \times 10^{-4}$ |
| Comparative Example 2 | 3.8 | $1.0 \times 10^{-2}$ |
| Comparative Example 3 | 11.5 | $8.5 \times 10^{-5}$ |
| Comparative Example 4 | 21.4 | $4.5 \times 10^{-3}$ |
| Comparative Example 6 | 4.6 | $7.2 \times 10^{-3}$ |
| Comparative Example 7 | 6.1 | $6.5 \times 10^{-3}$ |
| Comparative Example 8 | 26.1 | $2.2 \times 10^{-4}$ |
| Example 2 | 19.7 | $2.7 \times 10^{-3}$ |

Figure 7:
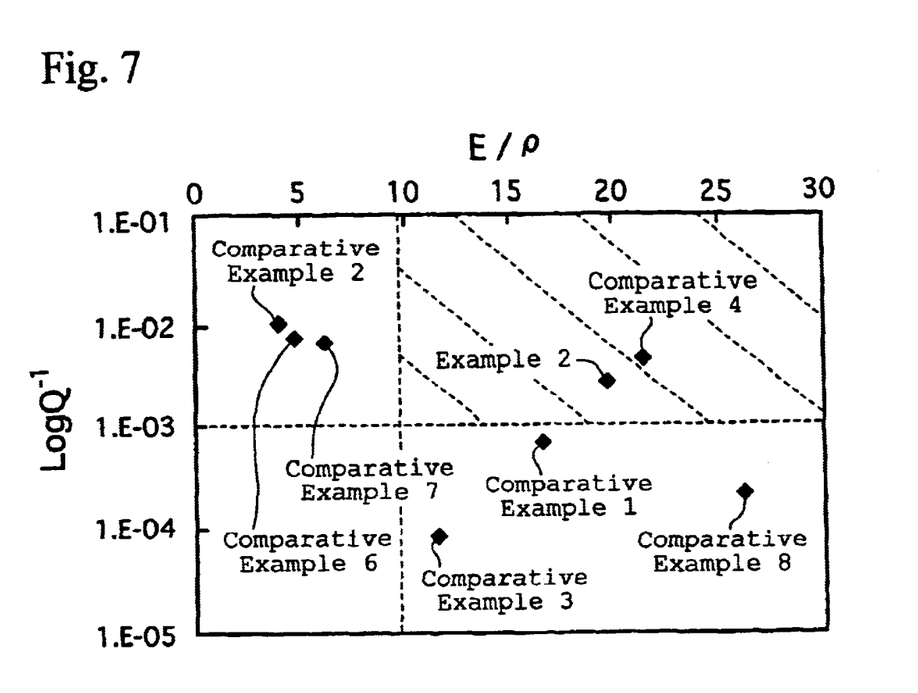
FIG. 7 relates to evaluation 4, showing a graph that indicates the specific Young's modulus and the internal friction of the mouthpiece bodies of Example 2, and Comparative Examples 1 to 4 and 6 to 8.

From Table 5, Table 6 and FIG. 7, it is understood that the mouthpiece body of Example 2 is similar to that of Comparative Example 4 made of ebony.

(Evaluation 5)

The mouthpiece body of Comparative Example 2 was compared with that of Example 2 with respect to their strain ($\mu$m) in MD (machine direction) and CD (cross direction). The results are given in Table 7.

TABLE 7

| | Strain in MD (μm) | Strain in CD (μm) |
|---|---|---|
| Comparative Example 2 | 0 | 75 |
| Example 2 | 0 | 0 |

From Table 7, it is understood that the strain in CD of the mouthpiece body of Comparative Example 2 is large but the mouthpiece body of Example 2 has no strain in both directions.

Fitting members No. 1 of Plates #1 to #3 and fitting members No. 2 were prepared. With any of the fitting members, a reed was fitted to the mouthpiece bodies of Comparative Example 2 and Example 2 to produce mouthpieces. These were compared with respect to their strain in MD and CD. The results are given in Table 8.

TABLE 8

| | | | Strain in MD (μm) | Strain in CD (μm) |
|---|---|---|---|---|
| Comparative Example 2 | Fitting Member No. 1 | Plate #1 | 250 | −100 |
| | | Plate #2 | 150 | −30 |
| | | Plate #3 | 100 | −50 |
| | Fitting Member No. 2 | | 400 | −70 |
| Example 2 | Fitting Member No. 1 | Plate #1 | 20 | −10 |
| | | Plate #2 | 0 | 0 |
| | | Plate #3 | 0 | 0 |
| | Fitting Member No. 2 | | 30 | −10 |

From Table 8, it is understood that the strain in MD and CD of the mouthpiece of Example 2 is much smaller than that of the mouthpiece of Comparative Example 2.

(Evaluation 6)

The mouthpieces of Example 2 and Comparative Example 2 were tested to measure the sound pressure (dB) relative to the breath pressure (kPa) applied thereto. The data in a high-pitched sound range are shown in FIG. 8; and those in a low-pitched sound range are shown in FIG. 9.

Figure 8:
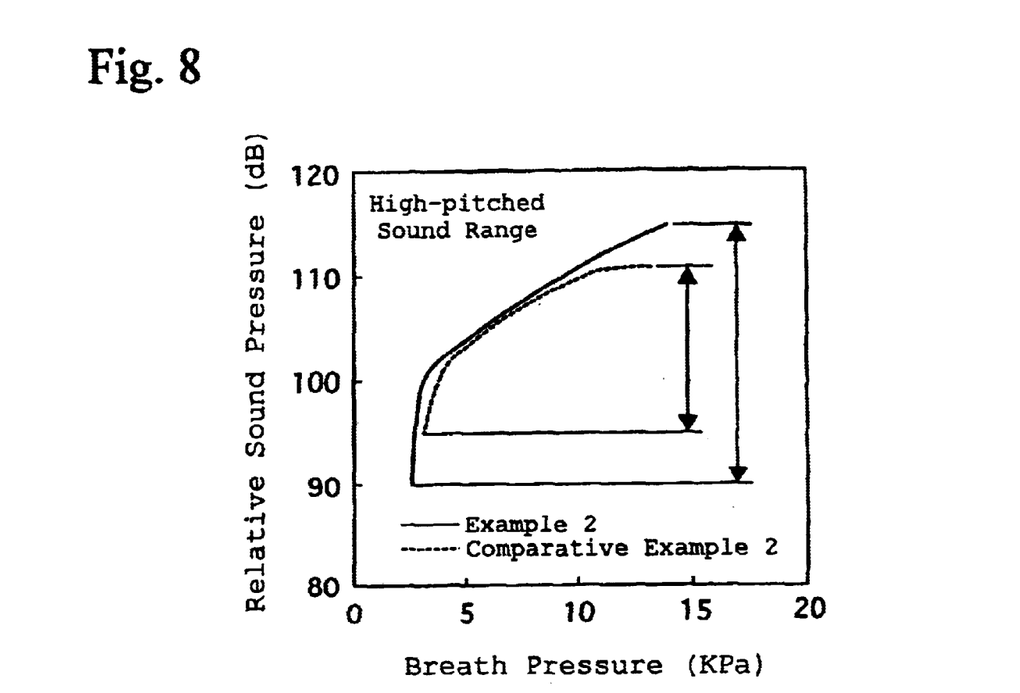
FIG. 8 relates to evaluation 6, showing a graph that indicates the relationship of the mouthpieces of Example 2 and Comparative Example 2 between the breath pressure and the relative sound pressure in a high-pitched sound range.
Figure 9:
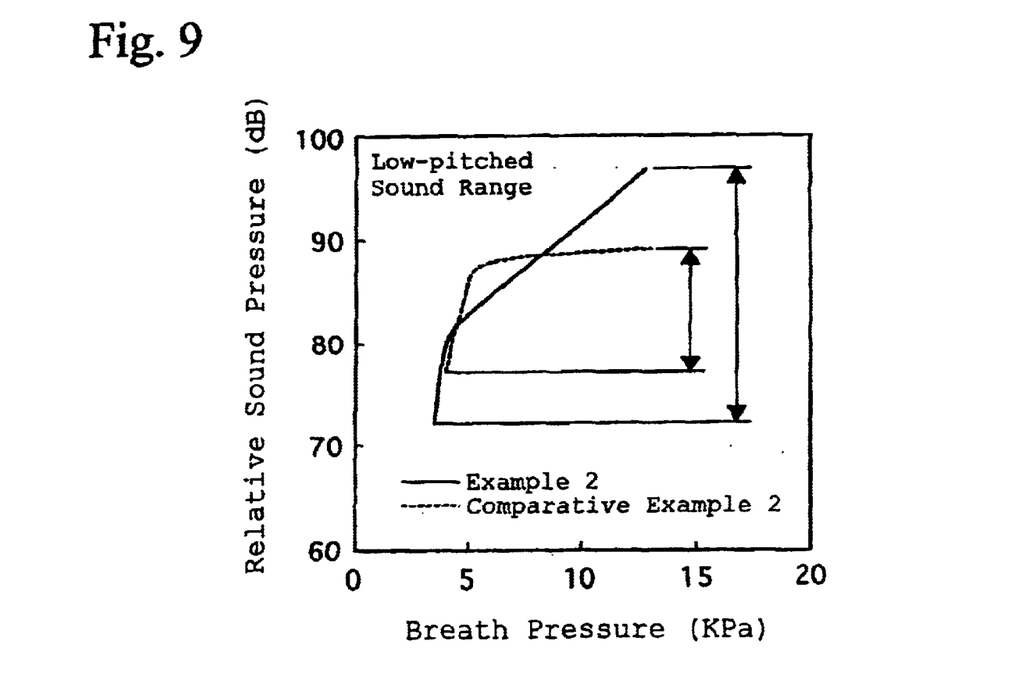
FIG. 9 relates to evaluation 6, showing a graph that indicates the relationship of the mouthpieces of Example 2 and Comparative Example 2 between the breath pressure and the relative sound pressure in a low-pitched sound range.

From FIG. 8 and FIG. 9, it is understood that the mouthpiece of Example 2 ensures a broader dynamic sound range than that of Comparative Example 2.

From the above-mentioned evaluation tests, it is understood that the mouthpiece of Example 2 produces excellent sound tones.

Accordingly, it is understood that the mouthpiece body 2 for clarinets produced according to the embodiment of the method for production of the invention ensures really satisfactory characteristics for its use.

Needless-to-say, the invention is applicable not only to musical instruments but also to building materials and constitutive members for machines, etc.

INDUSTRIAL APPLICABILITY

Accordingly, a ceramic product having really satisfactory characteristics for their use are obtained according to the method for production of the invention.

What is claimed is:

1. A method for production of a ceramic product, comprising:
   providing a porous ceramic material having a first set of desired properties;
   providing a thermosetting resin having a second set of desired properties;
   infiltrating said porous ceramic material with said thermosetting resin; and
   curing said thermosetting resin in said porous ceramic material, wherein said first and second sets of properties and an infiltration ratio are controlled in such a manner that said ceramic product has a Young's modulus of elasticity falling between 10 and 100 GPa and a maximum internal friction, represented by the natural logarithm of the inverse of said internal friction, equals to $1\times10^{-3}$.

2. A method for production of a ceramic product according to claim 1, wherein said ceramic product is a resonator pipe.

* * * * *